(12) United States Patent
Johnson et al.

(10) Patent No.: US 7,194,878 B2
(45) Date of Patent: Mar. 27, 2007

(54) VEHICLE BOOTING DEVICE

(76) Inventors: Glenn Johnson, 1203 Stelton Rd., Beach Lake, PA (US) 18405; Kevin Mak, 136 Crestwood Dr., Warren, NJ (US) 07059; John Pallay, 97 Woodledge Village, Hawley, PA (US) 18428

( * ) Notice: Subject to any disclaimer, the term of this patent is extended or adjusted under 35 U.S.C. 154(b) by 0 days.

(21) Appl. No.: 10/997,387

(22) Filed: Nov. 26, 2004

(65) Prior Publication Data

US 2006/0112744 A1 Jun. 1, 2006

(51) Int. Cl.
*B60R 25/00* (2006.01)

(52) U.S. Cl. .................. 70/19; 70/226; 70/461; 70/462

(58) Field of Classification Search .............. 70/225, 70/226, 19, 461, 14, 18, 227, 233, 259, 260, 70/237, 462; 188/31, 32
See application file for complete search history.

(56) References Cited

U.S. PATENT DOCUMENTS

| | | | | | |
|---|---|---|---|---|---|
| 458,832 | A | * | 9/1891 | Hohoff | 70/226 |
| 561,070 | A | * | 5/1896 | Anderson | 70/226 |
| 978,594 | A | * | 12/1910 | Jones | 70/19 |
| 1,098,103 | A | * | 5/1914 | Freschl | 224/42.25 |
| 1,165,295 | A | * | 12/1915 | Stevens | 188/31 |
| 1,235,356 | A | * | 7/1917 | Marks | 188/32 |
| 1,301,498 | A | * | 4/1919 | Pohl | 70/253 |
| 1,307,161 | A | * | 6/1919 | Stubblefield | 70/226 |
| 1,376,114 | A | * | 4/1921 | Raney | 70/18 |
| 1,408,133 | A | * | 2/1922 | Ochs et al. | 70/18 |
| 1,409,106 | A | * | 3/1922 | Hess | 70/19 |
| 1,439,111 | A | * | 12/1922 | Laney | 70/203 |
| 1,443,009 | A | * | 1/1923 | Davis | 70/226 |
| 1,445,623 | A | * | 2/1923 | Frode | 410/19 |
| 3,695,071 | A | * | 10/1972 | West | 70/225 |
| 4,164,131 | A | * | 8/1979 | Desmond et al. | 70/14 |
| 4,326,747 | A | * | 4/1982 | Finnegan | 294/147 |
| 4,649,724 | A | * | 3/1987 | Raine | 70/226 |
| 5,134,868 | A | * | 8/1992 | Bethards | 70/18 |
| 5,372,018 | A | * | 12/1994 | Smith | 70/18 |
| 5,706,682 | A | * | 1/1998 | Barker et al. | 70/226 |
| 5,832,760 | A | * | 11/1998 | Firmin | 70/226 |
| 5,873,275 | A | * | 2/1999 | Lukich | 70/226 |
| 6,434,980 | B1 | * | 8/2002 | Foster | 70/19 |
| 6,938,734 | B2 | * | 9/2005 | Curl | 188/32 |

\* cited by examiner

*Primary Examiner*—Lloyd A. Gall
(74) *Attorney, Agent, or Firm*—Robert Stephen Salzman

(57) ABSTRACT

A device for booting the wheel of a vehicle comprises a dual capability for locking the wheel of either small or large vehicles. The booting device comprises a dual pair of pincer arms that are juxtaposed with respect to each other about a base member. The base member is composed of two sliding linkages that allow the pincer arms of one of the pair, to be adjusted about a wheel of a vehicle. The other pair of pincer arms acts as a stand member to prevent movement of the wheel. A lock in the base member secures the position of the arms, and prevents tampering.

3 Claims, 2 Drawing Sheets

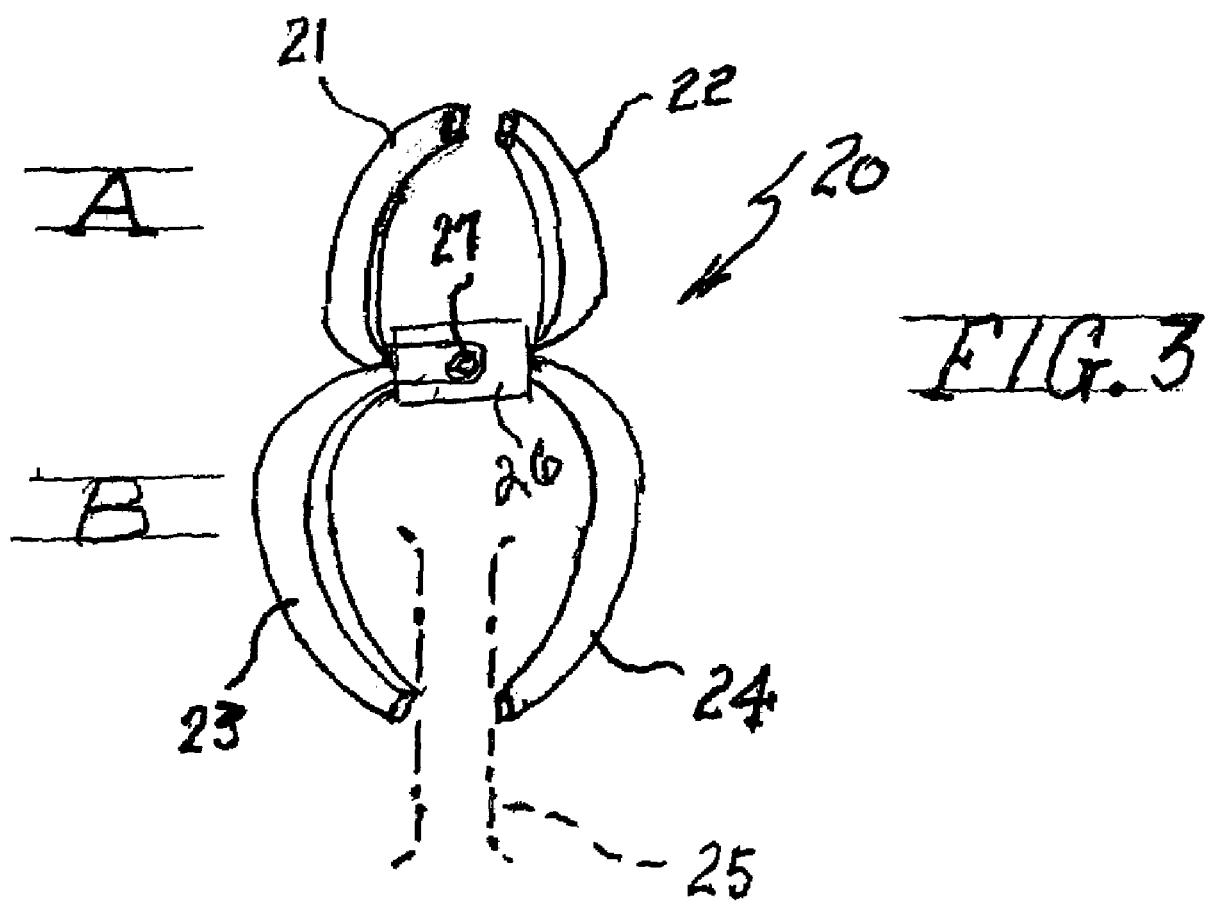

US 7,194,878 B2

VEHICLE BOOTING DEVICE

FIELD OF THE INVENTION

The present invention relates to automobile booting devices, and more particularly to a dual vehicle-booting device that provides means for locking the wheels of both small, and large-sized vehicles.

BACKGROUND OF THE INVENTION

There are many different types of wheel booting devices. However, most if not all booting devices have a portion of the booting apparatus touching, or coming into contact with the ground. This is so, in order to prevent the booted wheel from rotating. The apparatuses presently used for locking the wheels of various vehicles, are generally limited to a specific car types, e.g. mid-sized vehicles, compacts, SUVS, luxury vehicles, trucks, etc. This is so, because in order for the wheel boot to snuggly fit the wheel, the arms of the booting unit can only stretch or contract about the wheel in a limited range of vehicle types. Therefore, booting devices are made in a different range of sizes to fit the wheel of a particular vehicle type. This is both costly, and inconvenient for the operators of the booting service. They are forced to buy and carry more devices.

The present invention seeks to provide a dual wheel boot device, which can lock the wheels of both small and large vehicles. Thus, the invention is capable of extending the range over which it will be operative. Therefore, only one, or possibly two sizes of the inventive booting device will be required to fit all the vehicles an operator may encounter.

The current invention comprises two pairs of oppositely facing arms. The arm sections are integrally connected to a [1]mid-section comprising mating, rectangular linkages. The linkages slide together into a locked position, causing the arms to be secured about the wheel. Positioning one pair of arms about a wheel, and locking the sliding linkages, prevents the booted wheel from moving.

DISCUSSION OF RELATED ART

In U.S. Pat. No. 5,873,275; issued to: Lukich on Feb. 23, 1999, entitled: VEHICLE WHEEL LOCK, a booting device is shown featuring adjustable arms that wrap about a wheel rim, similar to that of the current invention. It is desired that the teachings of this patent be incorporated by way of reference into the description of this invention. A stand member, or handle, is attached to the transverse mating section between the arms, and serves to position the locked wheel against movement. The device claims to accommodate various sized wheels. This is true, but only within a narrow range of vehicle types, e.g. mid-sized automobiles. The present invention defines a greater vehicle range, by having two arm engaging sections: one section whose arms are shaped for compact or small vehicles for example, and a juxtaposed section, whose arms accommodate larger vehicles. Engagement of one section about a wheel, allows the other, juxtaposed section to operate as the stand member shown in the aforementioned patent. The juxtaposed arm section of this invention is used for positioning the wheel against movement, similar to the handle of the patent. In this manner, one of the arm sections of the current invention always acts as a stand member for the other arm section, but serves the dual purpose of fitting a different vehicle type.

SUMMARY OF THE INVENTION

In accordance with the present invention, a booting device is described that has the dual capability of fitting both large and small vehicles. The booting device comprises two pairs of pincer arms that are juxtaposed with respect to each other. The pincer arms are integrally connected to, and extend outwardly from a mid-section base. The base comprises mating, rectangular linkages that slide together into a locked position. As the base linkages slide together, the pincer arms are caused to move inwardly. One of the inwardly moving pair of pincer arms will engage and lock about a wheel of a vehicle. In this locked position, the other inwardly pair of pincer arms operate as a stand member, positioning the engaged wheel against movement, and contacting the ground thus preventing rotation of the wheel. A key operated lock disposed upon the mid-section base secures the linkages and the pairs of pincer arms against further lateral movement and device tampering.

The present invention defines a booting device that features a greater vehicle range by having two arm engaging sections: one section whose arms are shaped for engagement with compact or small vehicles, and a juxtaposed section, whose arms accommodate large vehicles. Engagement of one section about a wheel, allows the other, juxtaposed section to operate as a stand member. The juxtaposed arm section is used for positioning the wheel against movement.

It is an object of this invention to provide an improved vehicle wheel-booting device.

It is another object of the current invention to provide a wheel-booting device that can service different vehicle types.

BRIEF DESCRIPTION OF THE DRAWINGS

A complete understanding of the present invention may be obtained by reference to the accompanying drawings, when considered in conjunction with the subsequent detailed description, in which:

FIG. 3 shows a front, schematic, in situ view of the assembled booting device of this invention.

DESCRIPTION OF THE PREFERRED EMBODIMENT

Generally speaking, a device for booting the wheel of a vehicle comprises a dual capability for locking the rim of either small or large vehicles. The booting device comprises a dual pair of pincer-arms that are juxtaposed with respect to each other about a base member. The base member is composed of two sliding linkages that allow the pincer arms of one pair, to be adjusted about a wheel of a vehicle. The other pair of pincer arms acts as a stand member to prevent movement of the wheel. A lock in the base member secures the position of the arms, and prevents tampering.

Figure 1:
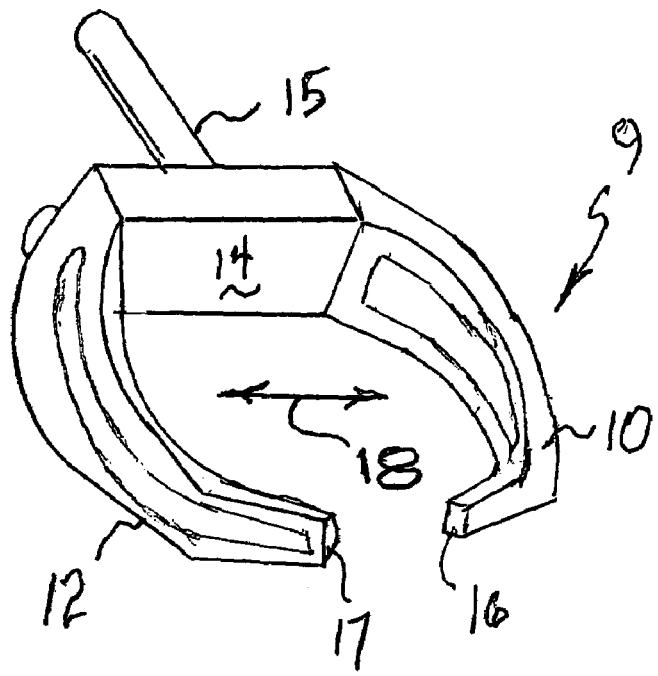
FIG. 1 illustrates a perspective view of a related art booting-device having similarity to the present invention.

Now referring to FIG. 1, related art booting device 9 is shown with a pair of respective pincer arms 12 and 14. The pincer arms 10 and 12, respectively are expandable and contractible with respect to a stand member 15, about the base section 14, as shown by arrows 18. The respective distal ends 16 and 17, engage the rim of a wheel to be booted. The wheel is locked in place, when a lock (not shown) in base 14, freezes the pincer arms 10 and 12 from further movement. Stand member 15 prevents the booted wheel from rotating.

Now referring to FIG. 3, a schematic, in situ, front view of the booting device 20 of this invention, is shown. Instead of having only one pair of arms 10 and 12 as in the related art, the inventive device 20 has two pairs of arms, each pair respectively designated by letters "A" and "B". Pair "A" comprises arms 21 and 22, respectively, and pair "B" comprises arms 23 and 24, respectively. Pair "A" has arms that are smaller than the arms of larger pair "B", as shown. Pair "B" is shown engaging the wheel 25 (illustrated in phantom) of a large vehicle. Pair "A" acts as a stand member (15) for the pair of arms "B".

For small vehicles, Pair "A" would engage the a small vehicle wheel (not shown), while Pair "B" would then act as the stand member for Pair "A".

The two pairs of arms "A" and "B", are each connected to a base member 26, as shown. The base member 26 has a keyway 27 for actuating a locking mechanism contained inside. The operation of the base member 26 will be better understood with reference to the assembly of device 20, shown in FIG. 2.

Figure 2:
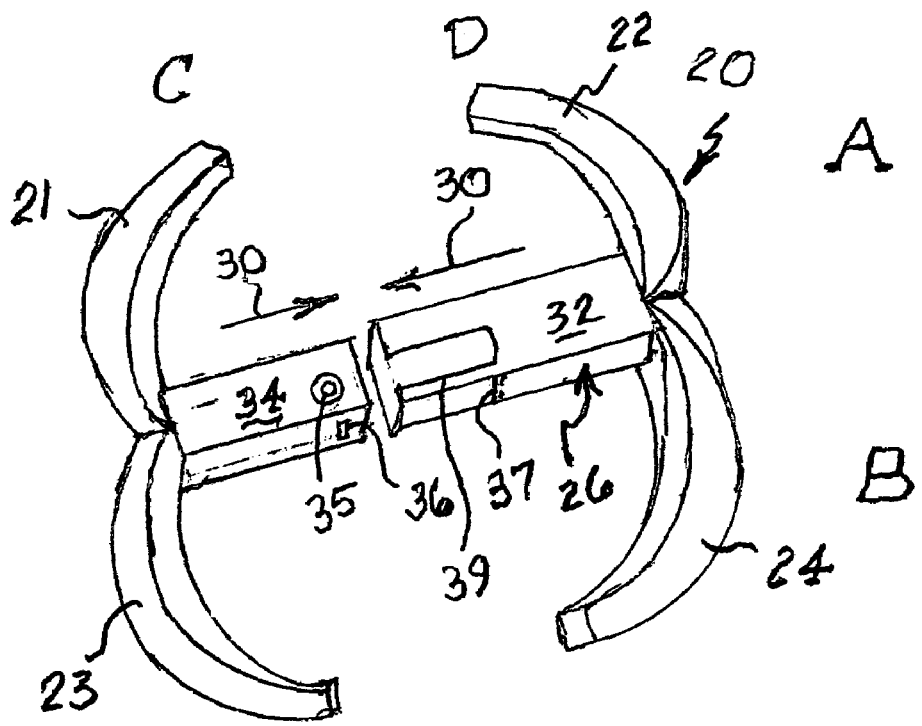
FIG. 2 depicts a front, schematic assembly view of the booting device of the current invention.

Referring to FIG. 2, booting device 20 is shown in an assembly view. The booting device comprises two sections "C" and "D", which slide together, as illustrated by arrows 30. The base member 26 is comprised of two rectangular linkages 32 and 34, respectively. Link 34 contains an internal locking mechanism (not shown). A lock 35 allows a key to actuate the locking mechanism. Link 34 slides into hollow link 32. The linkages 32 and 34 are locked together, when a key is inserted and turned in lock 35. The locking mechanism will project a bolt (not shown) through slot 36. The bolt will engage with internal abutment 37 disposed in link 32, thus preventing links 32 and 34 from being pulled apart. Slot 39 allows for the lock 35 to move across link 32, thus positioning lock 35 at the center of the base member 26.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired for protection by Letters Patent is presented in the subsequently appended claims.

What is claimed is:

1. A method of booting a wheel of an automotive vehicle, comprising the steps of:
    (a) engaging a wheel rim with a first set of claws such that the claws cannot be removed from said wheel, wherein a tire of said wheel being contiguous with the ground;
    (b) positioning a second set of claws that are attached to said first set of claws, and that are smaller in size with respect to said first set of claws, in a position that will result in said second set of claws contacting the ground, whereby said tire and said wheel will be prevented from rotating; and
    (c) reversing said positions of said first and second set of claws, and repeating steps (a) and (b) for a different automotive wheel.

2. A booting method for automobiles, comprising the steps of:
    (a) locking a first set of claws about a first wheel that is resting upon the ground;
    (b) positioning a second set of claws attached to said first set of claws, such that it will contact the ground;
    (c) subsequently unlocking the first set of claws;
    (d) locking said second set of claws about a second wheel having a size that is different than that of said first wheel; and
    (e) positioning said first set of claws such that it will contact the ground.

3. In a booting method for automobiles, including a booting device comprising a first set of pincers, a second set of pincers smaller than the first set of pincers, and a locking mechanism disposed between the sets for locking both sets of pincers; wherein said first set of pincers is locked about a first wheel that is resting upon the ground, and said second set of pincers which is attached to said first set of pincers is positioned to contact the ground, and then the method is subsequently reversed for a second wheel of a different size wherein said second set of pincers is locked about said second wheel of a different size and said first set of pincers is positioned to contact the ground.

* * * * *